(12) United States Patent
Lin et al.

(10) Patent No.: US 11,820,002 B2
(45) Date of Patent: Nov. 21, 2023

(54) FLANGE DEVICE USING VOICE COIL MOTOR AND CONTACT CONTROL METHOD THEREOF

(71) Applicant: NATIONAL TAIPEI UNIVERSITY OF TECHNOLOGY, Taipei (TW)

(72) Inventors: Hsien-I Lin, Taipei (TW); Yu-Han Chen, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 0 days.

(21) Appl. No.: 17/699,205

(22) Filed: Mar. 21, 2022

(65) Prior Publication Data

US 2023/0294303 A1    Sep. 21, 2023

(51) Int. Cl.
*H02P 7/025* (2016.01)
*B25J 15/04* (2006.01)
*B25J 11/00* (2006.01)
*B25J 13/08* (2006.01)
*B25J 15/00* (2006.01)
*H02K 41/035* (2006.01)

(52) U.S. Cl.
CPC ......... *B25J 15/045* (2013.01); *B25J 11/0065* (2013.01); *B25J 13/085* (2013.01); *B25J 13/088* (2013.01); *B25J 15/0019* (2013.01); *H02K 41/0356* (2013.01); *H02P 7/025* (2016.02)

(58) Field of Classification Search
CPC ............................ H02K 41/0356; H02P 7/025
See application file for complete search history.

(56) References Cited

FOREIGN PATENT DOCUMENTS

| CN | 211415176 U | * | 9/2020 |
| CN | 113400143 A | * | 9/2021 |

* cited by examiner

Primary Examiner — Randell J Krug
(74) Attorney, Agent, or Firm — Chih Feng Yeh; Huntington IP Consulting Co., Ltd.

(57) ABSTRACT

A flange device using a voice coil motor and a contact control method thereof are disclosed. In the flange device, a force sensor, displacement sensor and an inertial measurement unit (IMU) are used to sense contact data, the contact data is filtered, and the filer contact data is calculated based on an attitude & heading reference systems (AHRS) algorithm, to obtain a force control command to control a displacement direction and a displacement distance of the flange device, so that the flange device is able to adjust a contact status between a polishing device and a to-be-polished object by using the voice coil motor, thereby achieving the technical effect of providing an electromagnetic contact-state adjustment device with quiet and precise control and fast response.

8 Claims, 7 Drawing Sheets

FLANGE DEVICE USING VOICE COIL MOTOR AND CONTACT CONTROL METHOD THEREOF

BACKGROUND

1. Technical Field

The present invention is related to a flange device and a contact control method thereof, and more particularly to a flange device using a voice coil motor, filtering contact data, and calculating the filtered contact data based on an attitude & heading reference systems (AHRS) algorithm to obtain a force control command, and a contact control method thereof.

2. Related Art

In industrial production, when a tandem robot arm is performing a polishing operation, maintaining a contact status of a polishing device and a to-be-polished object is a necessary goal. However, during the polishing operation, the tandem robot arm only polishes the surface of the to-be-polished object along a preset polishing path, and an error between the preset polishing path and the surface of the to-be-polished object actually exists, so the conventional polishing operation has a problem of invalid polishing operation because the tandem robot arm is not in contact with the surface of the to-be-polished object, and a problem of excessive wear of the surface of the to-be-polished object due to excessive contact between the tandem robot arm and the surface of the to-be-polished object.

In order to solve the above-mentioned problem, a contact-status adjustment device for adjusting the contact status at the distal end of the tandem robot arm is applied to improve polishing quality. The conventional contact-status adjustment devices are all pneumatic reciprocating mechanisms, and the adjustment operations includes the correction of the contact force and the correction of the contact position. However, the conventional pneumatic contact-status adjustment device still has problem of insufficient adjustment accuracy due to excessive environmental noise and unstable air pressure.

According to above-mentioned contents, what is needed is to develop an improved solution to solve the conventional technology problem that the conventional pneumatic adjustment device used in the tandem robot arm for the polishing operation has insufficient adjustment accuracy due to excessive environmental noise and instable air pressure.

SUMMARY

An objective of the present invention is to provide a flange device using a voice coil motor and a contact control method thereof, to solve the conventional technology problem that the conventional pneumatic adjustment device has the problems of excessive environmental noise and insufficient adjustment accuracy due to instable air pressure.

In order to achieve the objective, the present invention provides a flange device using a voice coil motor, and the flange device is configured to clamp and fasten the polishing device; the flange device is fastened on a distal end of a tandem robot arm and includes a movable member, a voice coil motor, a force sensor, a displacement sensor, an inertial measurement unit (IMU), and a fastening base frame.

The movable member includes a motion limiting part protruded thereon. The force sensor is configured to sense a contact force of the flange device during a polishing operation process. The displacement sensor is configured to sense a displacement direction and a displacement distance of the movable member. The inertial measurement unit is configured to measure three-axis Euler angles and three-axis accelerations of the flange device.

The fastening base frame includes a fastening part, a motor fastening groove and an position-limiting accommodation part, wherein the voice coil motor is fastened on an inner surface of the fastening part and disposed in the motor fastening groove, the motion limiting part is fastened in the voice coil motor, the motion limiting part is protruded into the motor fastening groove and configured to tightly fit with the position-limiting accommodation part, wherein the force sensor, the displacement sensor and the inertial measurement unit are disposed on the position-limiting accommodation part, and when the movable member is driven to move relative to the position-limiting accommodation part by the voice coil motor, the movement of the movable member is limited by the fastening part and the motion limiting part.

In order to achieve the objective, the present invention provides a contact control method for the above-mentioned flange device using the voice coil motor, and the contact control method includes steps of: receiving a contact force of the flange device from the force sensor, by a controlling device; receiving a displacement direction and a displacement distance of the movable member from the displacement sensor, by the controlling device; receiving three-axis Euler angles and a three-axis accelerations of the flange device from the inertial measurement unit, by the controlling device; calculating a tilted angle of the flange device based on three-axis accelerations of the flange device and an attitude & heading reference systems (AHRS) algorithm, by the controlling device; calculating a gravity response on the flange device based on a weight and the tilted angle of the flange device, and excluding the gravity response, by the controlling device; performing data filtering on the three-axis accelerations of the flange device, by the controlling device; integrating the filtered three-axis accelerations of the flange device to calculate three-axis speeds, respectively, by the controlling device; performing data filtering on the three-axis speeds of the flange device, by the controlling device; integrating the filtered three-axis speeds of the flange device to calculate three-axis displacements, respectively, by the controlling device; calculating the three-axis displacements of the flange device; performing correction on the AHRS algorithm based on the calculated three-axis displacements of the flange device and the sensed displacement distance of the movable member, and calculating a force control command to control the displacement direction and the displacement distance of the movable member, by the controlling device.

According to the above-mentioned flange device and the contact control method of the present invention, the difference between the present invention and the conventional technology is that the force sensor, the displacement sensor and the inertial measurement unit of the flange device of the present invention are used to sense the contact data, and the contact data is filtered, and the filtered contact data is calculated based on the attitude & heading reference systems (AHRS) algorithm, to obtain the force control command to control the displacement direction and the displacement distance of the flange device, so that the flange device is able to adjust the contact status between the polishing device and the to-be-polished object by using the voice coil motor.

Therefore, the technical solution of the present invention is able to achieve the technical effect of providing an electromagnetic contact-state adjustment device with quiet and precise control and fast response.

BRIEF DESCRIPTION OF THE DRAWINGS

The structure, operating principle and effects of the present invention will be described in detail by way of various embodiments which are illustrated in the accompanying drawings.

DETAILED DESCRIPTION

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Figure 1A:
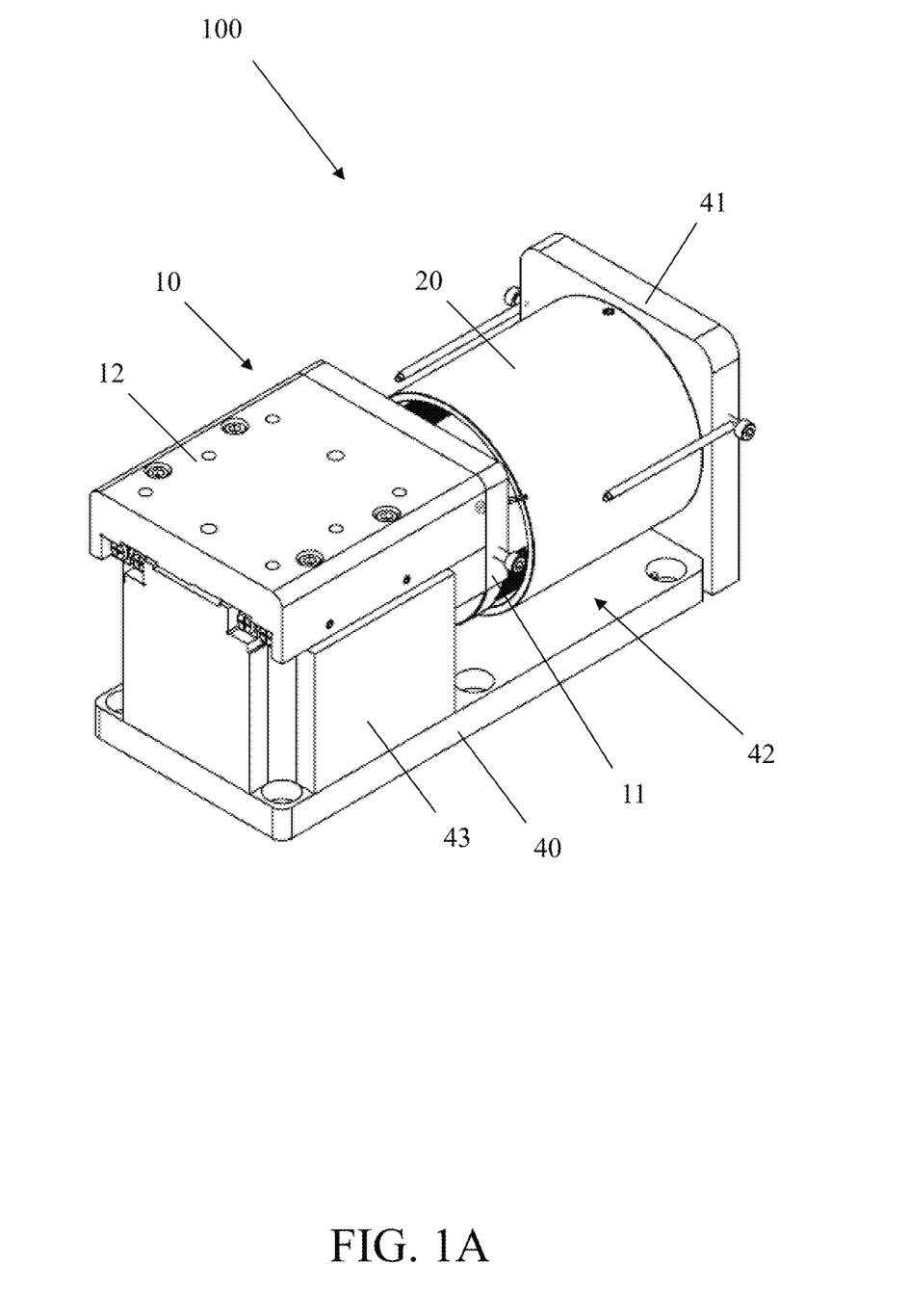
FIG. 1A is a perspective view of a flange device using a voice coil motor, according to the present invention.
Figure 1B:
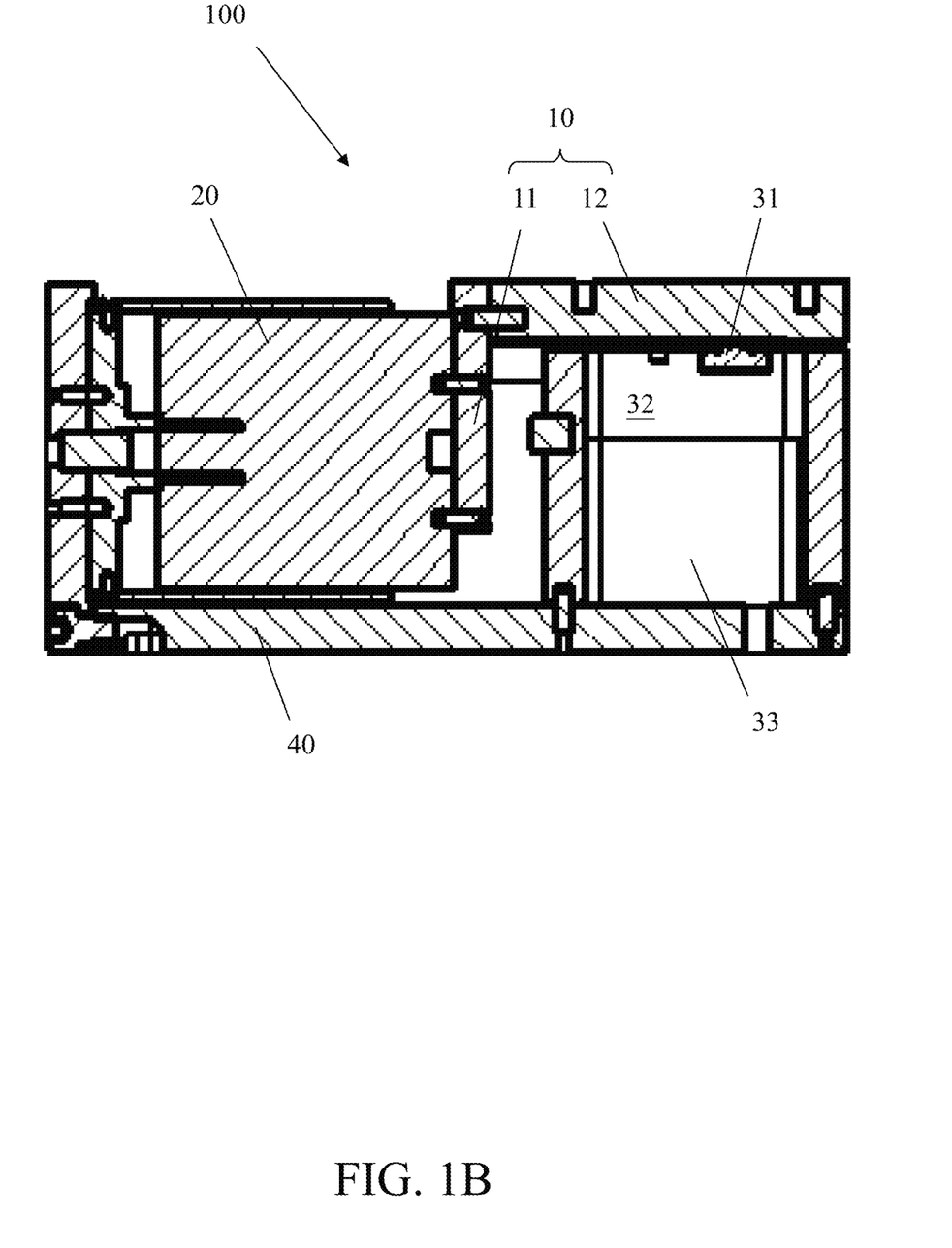
FIG. 1B is a sectional view of a flange device using a voice coil motor, according to the present invention.

The features of the flange device of the present invention will be described in the following paragraphs. Please refer to FIGS. 1A and 1B. FIG. 1A is a perspective view of a flange device using a voice coil motor, according to the present invention; FIG. 1B is a sectional view of the flange device using the voice coil motor, according to the present invention.

A flange device 100 of the present invention is fastened on a distal end of a tandem robot arm, and includes a movable member 10, a voice coil motor 20, a force sensor 31, a displacement sensor 32, an inertial measurement unit (IMU) 33, and a fastening base frame 40. The movable member 10 includes a motion limiting part 11, the fastening base frame 40 includes a fastening part 41, a motor fastening groove 42 and a position-limiting accommodation part 43. In an embodiment, the movable member 10 and the fastening base frame 40 are made by metal materials.

The voice coil motor 20 is a voice coil motor in a cylindrical shape, and formed by a permanent magnet and a coil. For the voice coil motor 20, when the effect caused by a thickness of the coil on a magnetic field is not considered, the magnetic field of a conductive wire is proportional to a current and inverse proportional to a distance, and satisfies the equation below:

$$B = \frac{\mu I}{2\pi r}, r \geq R$$

wherein r is a distance from a center of the conductive wire, R is a radius of the conductive wire, B is the magnetic field at a point from the conductive wire by a distance r, I is current, and $\mu$ is the magnetic permeability. The magnetic permeability in vacuum is $4\pi \times 10^{-7}$, and the magnetic permeability of air is 1.00000037 times of the magnetic permeability of vacuum.

When the conductive wire is wound into a circle, the magnetic field at a height from the center of coil satisfies the equation below:

$$B = \frac{\mu I R^2}{2(R^2 + z^2)^{3/2}}$$

wherein R is a radius of the circle formed by the conductive wire, and z is the height from a central axis of the conductive wire.

When the conductive wire is wound into a solenoid, the magnetic field at any point x on the central axis of the solenoid satisfies the equation below:

$$B = \frac{\mu n I}{L} \left\{ \frac{L + 2x}{2[D^2 + (L + 2x)^2]^{1/2}} + \frac{L - 2x}{2[D^2 + (L - 2x)^2]^{1/2}} \right\}$$

wherein D is a diameter of the solenoid, L is a length of the solenoid, and x is a distance of a point on a central axis of the solenoid to a central point.

With the magnetic field control technology of the cylindrical voice coil motor, the voice coil motor 20 converts electric energy into magnetic field to generate kinetic energy, so as to move the coil relative to the permanent magnet.

The flange device 100 is fastened with the distal end of the tandem robot arm through an outer surface of the fastening part 41 of the fastening base frame 40, the voice coil motor 20 is fastened on an inner surface of the fastening part 41 of the fastening base frame 40, and disposed in the motor fastening groove 42 of the fastening base frame 40.

Figure 2A:
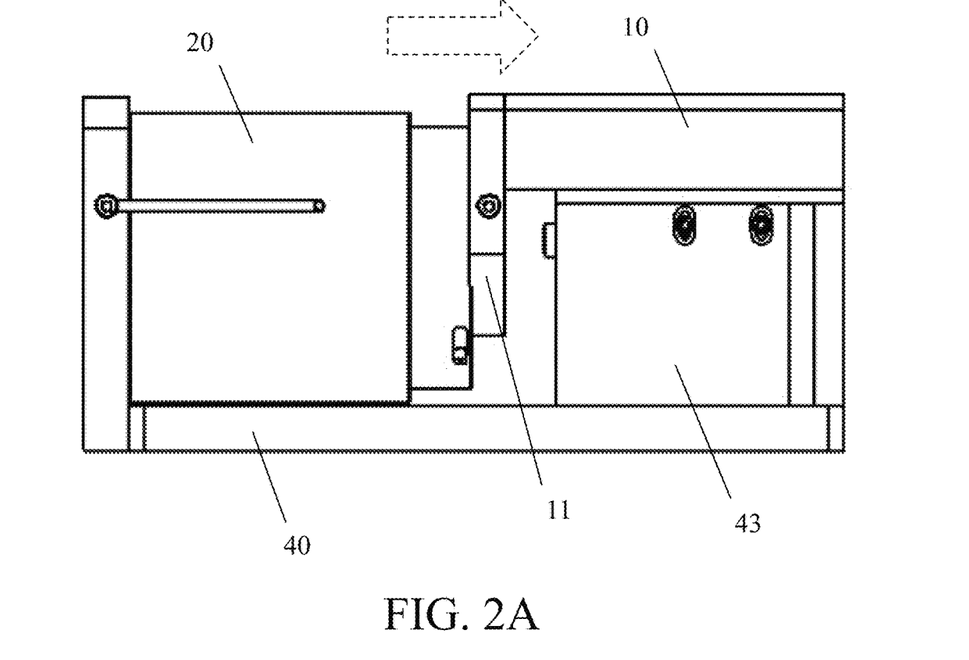
FIGS. 2A and 2B are plan views showing movement statuses of a movable member and a voice coil motor of a flange device using a voice coil motor, according to the present invention.
Figure 2B:
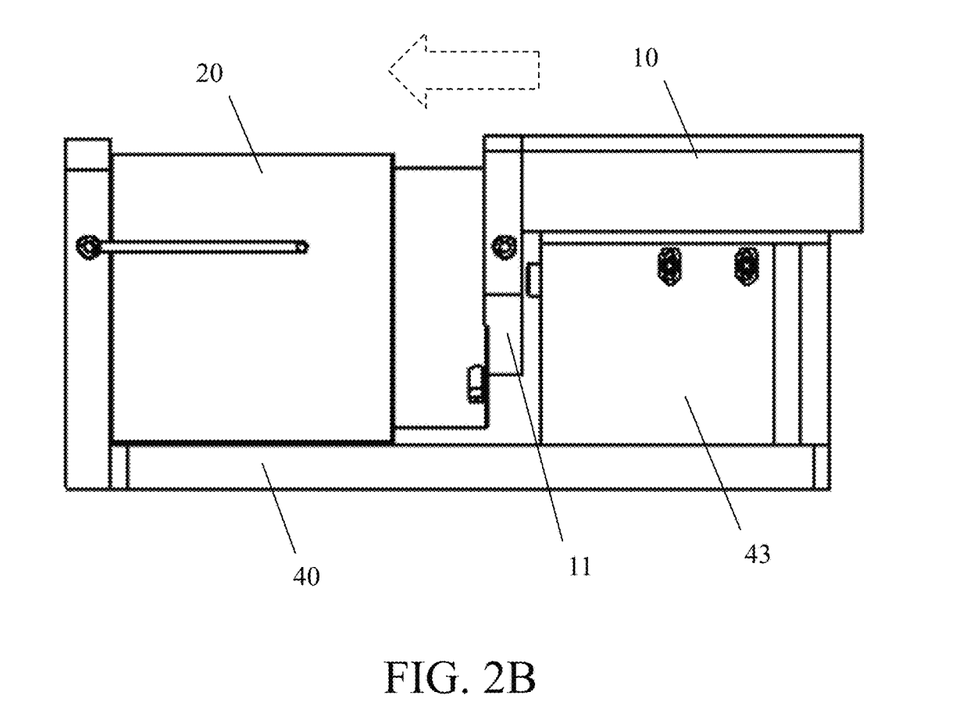

The coil of the voice coil motor 20 is configured to fasten the motion limiting part 11 of the movable member 10, so that the movable member 10 is driven to move when the coil of the voice coil motor 20 moves. Please refer to FIGS. 2A and 2B, which are plan views showing movement statuses of the movable member and the voice coil motor of the flange device of the present invention. The movement of the movable member 10 driven by the voice coil motor 20 can be from the status shown in FIG. 2A to the status shown in FIG. 2B, or from the status shown in FIG. 2B to the status shown in FIG. 2A.

The motion limiting part 11 is protruded on the movable member 10, and disposed on the motor fastening groove 42 of the fastening base frame 40, so that the motion range of the movable member 10 is limited by the motion limiting part 11 and the position-limiting accommodation part 43 of the fastening base frame 40 when the movable member 10 is driven by the voice coil motor 20.

The position-limiting accommodation part 43 of the fastening base frame 40 has an accommodation space formed therein, the accommodation space inside the position-limiting accommodation part 43 is configured to accommodate sensors including a force sensor 31, a displacement sensor 32 and an inertial measurement unit (IMU) 33; and one of the movable member 10 and the position-limiting accommodation part 43 of the fastening base frame 40 has a rail disposed thereon, the other of the movable member 10 and the position-limiting accommodation part 43 has a sliding slot disposed thereon and having a shape matching a shape of the rail, so that the movable member 10 is driven by the voice coil motor 20 to move relative to the position-limiting accommodation part 43 of the fastening base frame 40 through the rail and the sliding slot, and the position-limiting accommodation part 43 of the fastening base frame 40 tightly fits with the movable member 10, to protect the precise sensors including the force sensor 31, the displacement sensor 32 and the IMU 33 from being polluted by external dust, so as to prevent inaccurate sensed result.

The force sensor 31 is configured to sense a contact force of the flange device 100 during a polishing operation process, the displacement sensor 32 is configured to sense a displacement direction and a displacement distance of the movable member 10, the IMU 33 is configured to measure three-axis Euler angles and the three-axis accelerations of the flange device 100. In an embodiment, the three-axis Euler angles include a roll angle, a pitch angle and a yaw angle.

Figure 3:
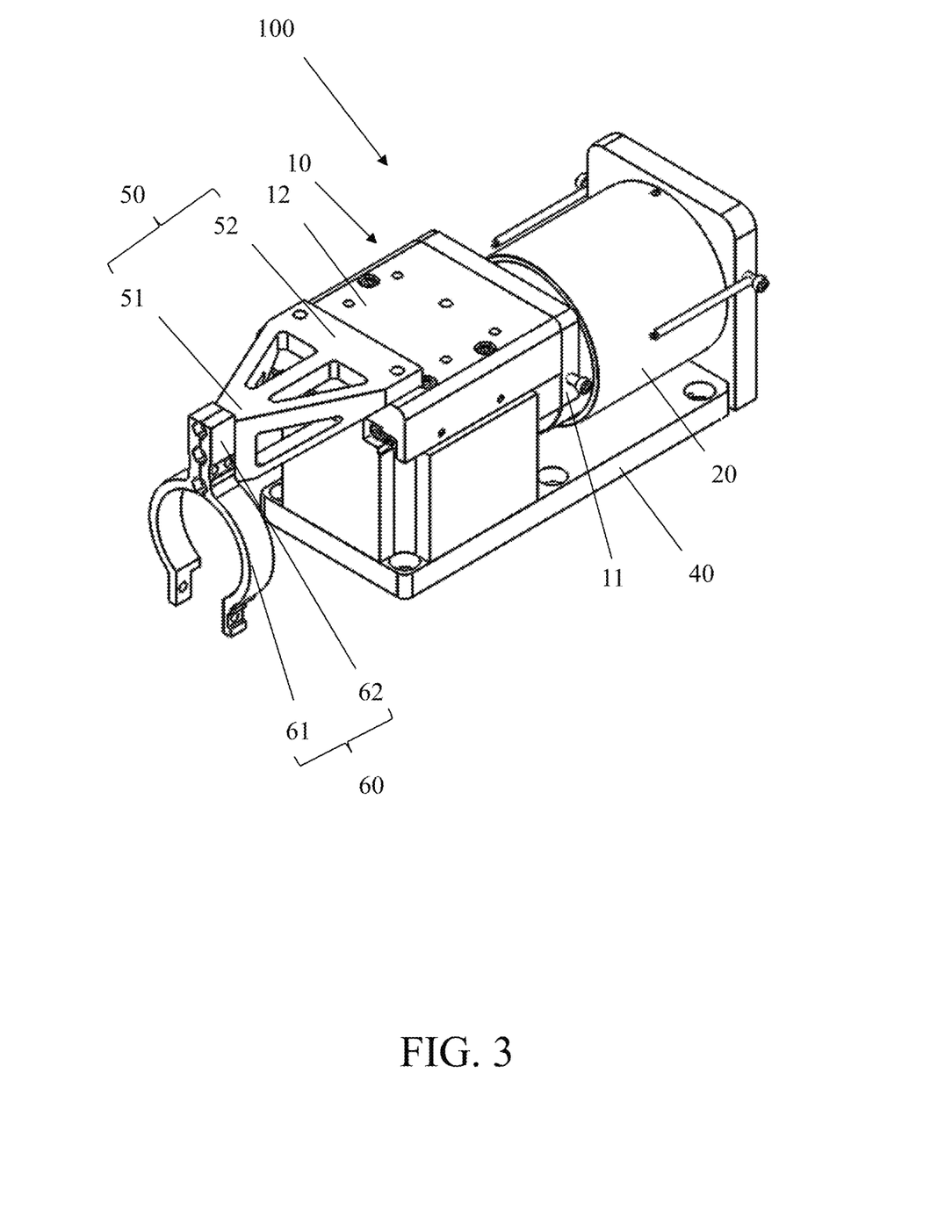
FIG. 3 is a perspective view of a polishing device fastening structure of a flange device using a voice coil motor, according to the present invention.

Please refer to FIG. 3, which is a perspective view of fastening structure of a flange device to fasten a polishing device, according to the present invention.

The flange device 100 can include a connection plate part 50 and a clamping member 60, the connection plate part 50 includes a top end 51 and a bottom end 52, the connection plate part 50 is fastened with a member fastening part 12 of the movable member 10 by a bottom end 52 thereof, so that the connection plate part 50 is also driven to move when the movable member is driven by the voice coil motor 20 to move.

The clamping member 60 includes a clamping part 61 and a clamping and fastening part 62, and the clamping member 60 is fastened with the top end 51 of the connection plate part 50 by the clamping and fastening part 62 thereof, so that the clamping member 60 is also driven to move when the movable member 10 is driven to move by the voice coil motor 20. The clamping part 61 of the clamping member 60 is configured to clamp and fasten the polishing device. In an embodiment, the connection plate part 50 and the clamping member 60 are made by polymer material.

Figure 4:
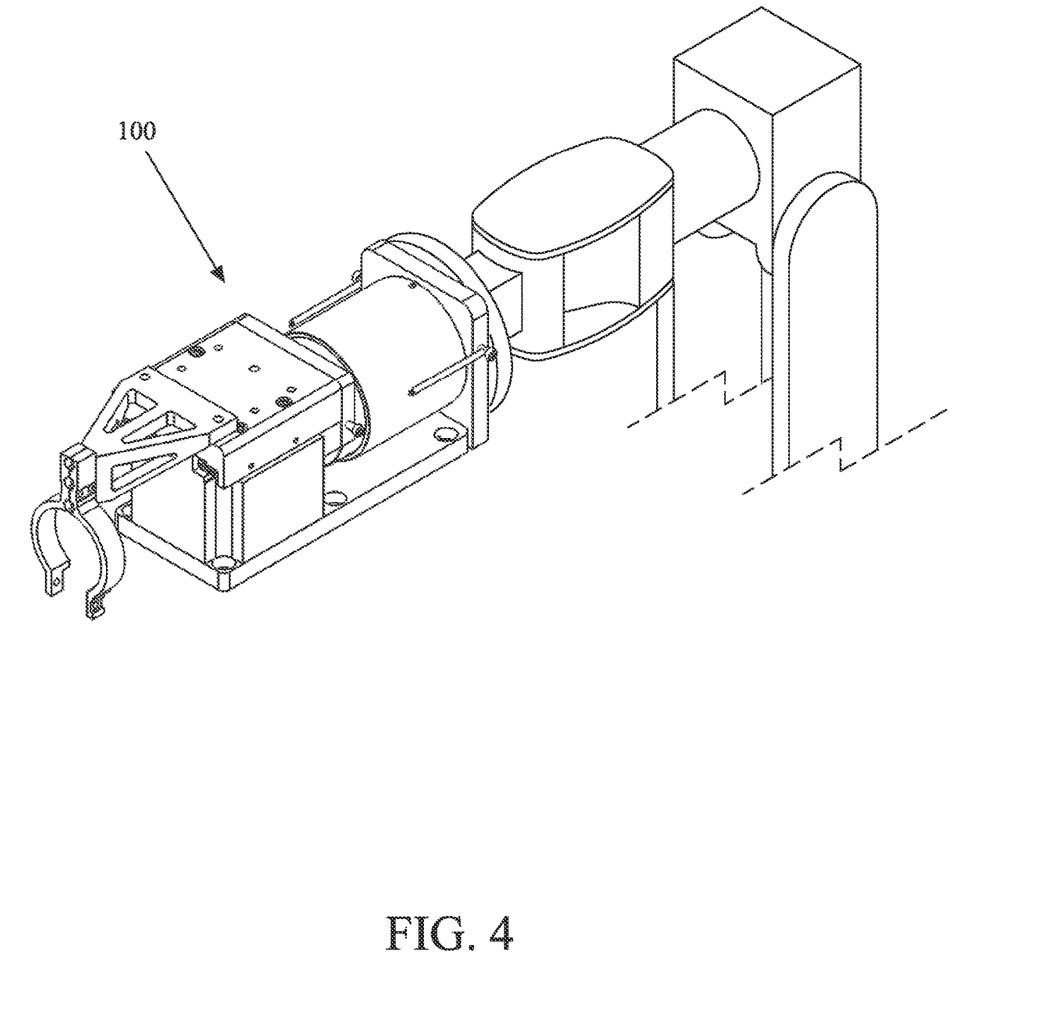
FIG. 4 is a perspective view showing a practical usage status of a flange device using a voice coil motor, according to the present invention.

The flange device 100 is fastened on a distal end of a tandem robot arm. Please refer to FIG. 4, which shows a practical usage status of the flange device 100 to clamp and fasten the polishing device. FIG. 4 is a perspective view showing a practical usage status of a flange device using a voice coil motor, according to the present invention.

The operation of the method of the present invention will be described in the following paragraphs. Please refer to FIGS. 5A and 5B, which are flowcharts of a contact control method for a flange device using a voice coil motor, according to the present invention.

Figure 5A:
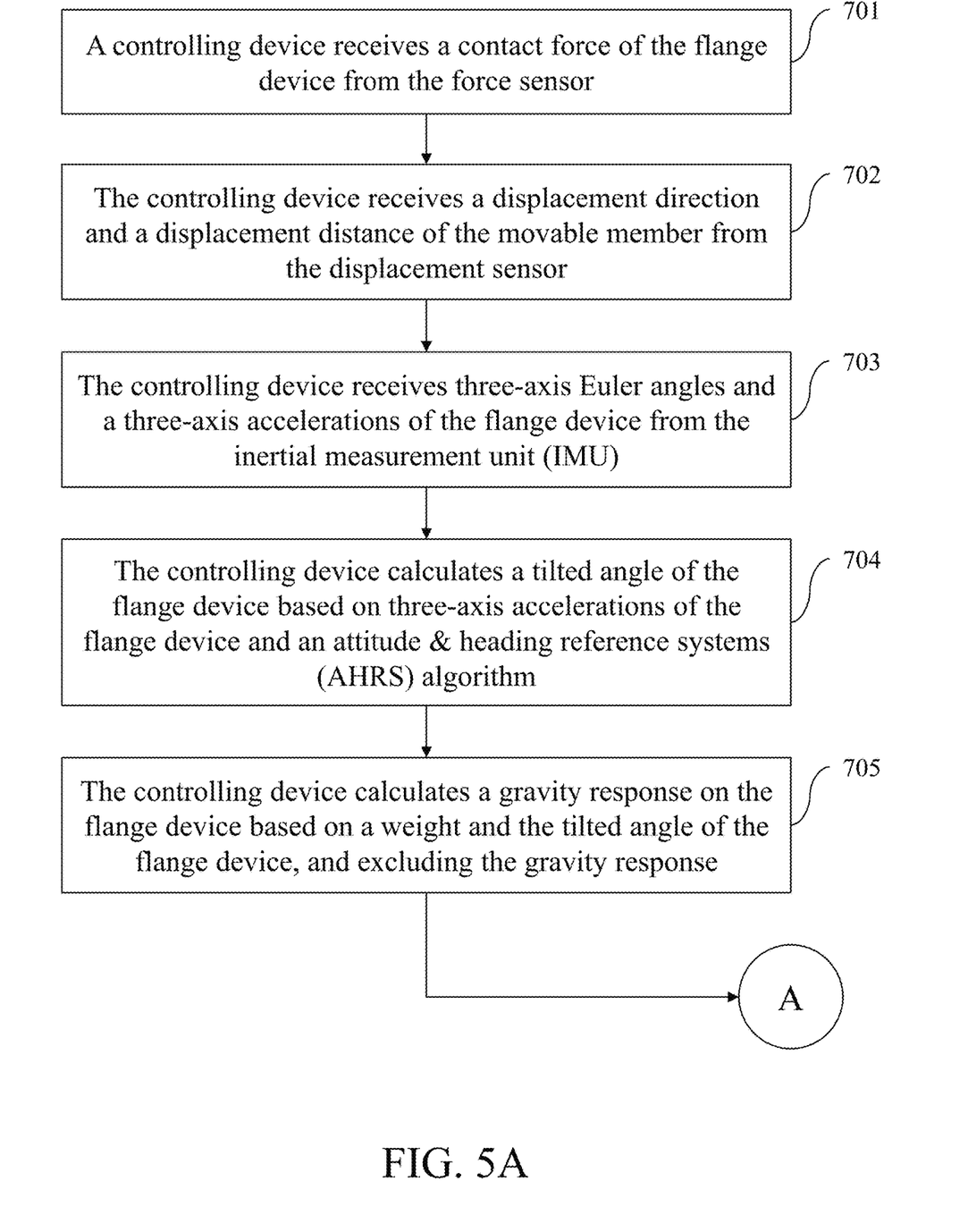
FIGS. 5A and 5B are flowcharts of a contact control method for a flange device using a voice coil motor, according to the present invention.
Figure 5B:
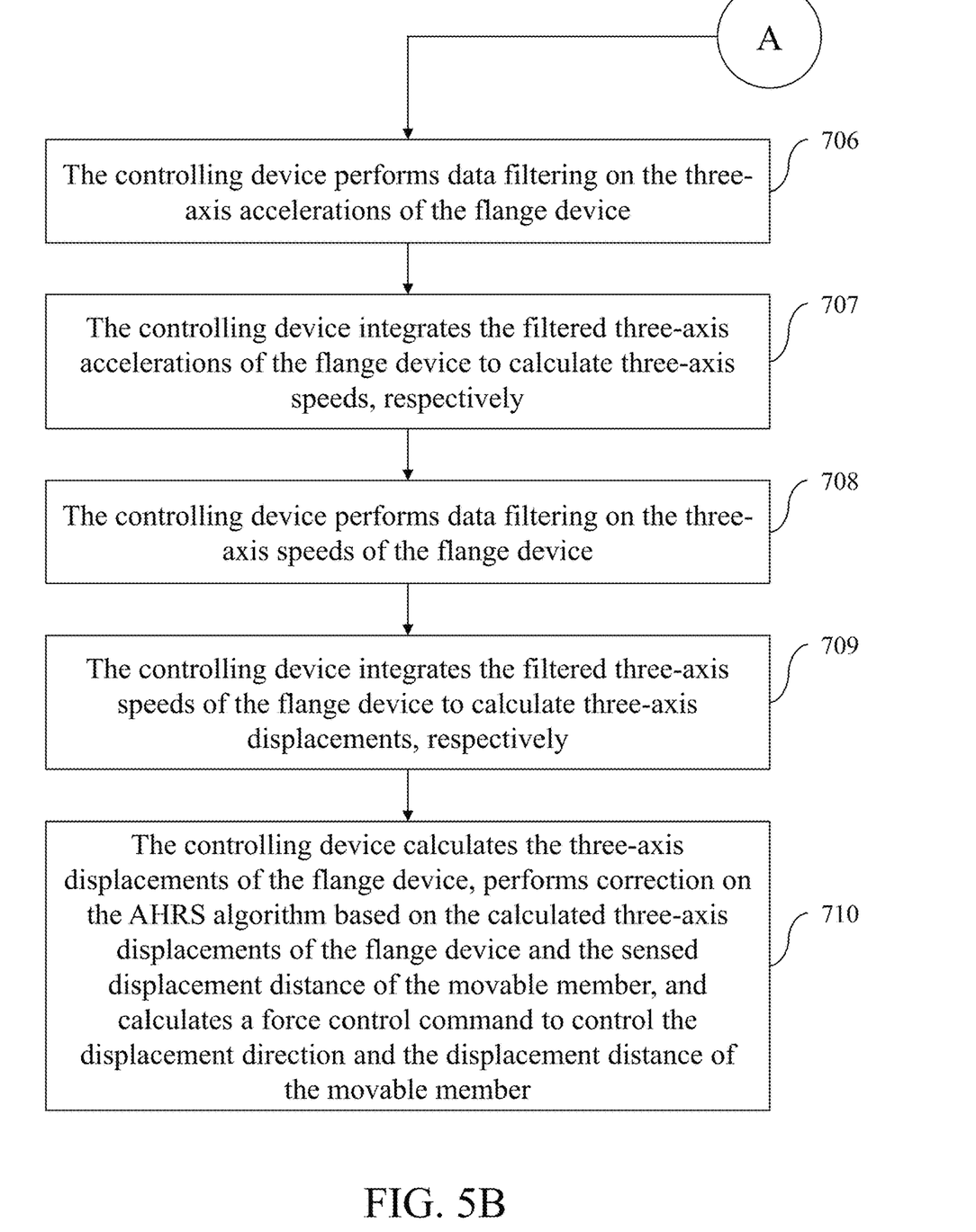

The contact control method for the above-mentioned flange device using the voice coil motor includes the following steps.

In a step 701, a controlling device receives a contact force of the flange device from the force sensor. In a step 702, the controlling device receives a displacement direction and a displacement distance of the movable member from the displacement sensor. In a step 703, the controlling device receives three-axis Euler angles and a three-axis accelerations of the flange device from the inertial measurement unit (IMU). In a step 704, the controlling device calculates a tilted angle of the flange device based on three-axis accelerations of the flange device and an attitude & heading reference systems (AHRS) algorithm. In a step 705, the controlling device calculates a gravity response on the flange device based on a weight and the tilted angle of the flange device, and excluding the gravity response. In a step 706, the controlling device performs data filtering on the three-axis accelerations of the flange device. In a step 707, the controlling device integrates the filtered three-axis accelerations of the flange device to calculate three-axis speeds, respectively. In a step 708, the controlling device performs data filtering on the three-axis speeds of the flange device. In a step 709, the controlling device integrates the filtered three-axis speeds of the flange device to calculate three-axis displacements, respectively. In a step 710, the controlling device calculates the three-axis displacements of the flange device, performs correction on the AHRS algorithm based on the calculated three-axis displacements of the flange device and the sensed displacement distance of the movable member, and calculates a force control command to control the displacement direction and the displacement distance of the movable member.

The tilted angle of the flange device 100 is defined as an included angle between a x-y coordinate plane of the IMU 33 and a horizontal plane of the Cartesian coordinate. When the IMU 33 is kept still, the IMU 33 is affect by gravity, so the three-axis accelerations measured by the IMU 33 can be mapped to components of Cartesian coordinate, to calculate the tilted angle of the flange device 100. The following is the calculation formula of the tilted angle of the flange device 100:

$$\theta = \tan^{-1}\left(\frac{\sqrt{Ax^2 + Ay^2}}{Az}\right)$$

wherein θ is a tilted angle of the flange device 100, and Ax, Ay and Az are components of the three-axis accelerations mapped into the Cartesian coordinate.

The response of the flange device 100 subject to weight can be calculated based on the following equation:

$$F_w = w \times \sin\theta$$

wherein Fw is a response of the flange device 100 subject to weight, w is a load of the flange device 100 and includes a weight of the flange device 100 and the weights of the connection plate part 50, the clamping member 60 and the polishing device fastened with the flange device 100, and θ is the tilted angle of the flange device 100.

Because of the high sensitivity of the IMU 33, the measured three-axis Euler angles and the three-axis accelerations are easily impacted by environmental noise, the controlling device performs data filtering on the three-axis accelerations and the three-axis speeds of the flange device 100 to reduce the noise impact on the high sensitivity of the IMU 33. The data filtering can be performed by an average algorithm, a minimization algorithm or a standardization algorithm; however, these examples are merely for exemplary illustration, and the application field of the present invention is not limited to these examples.

According to above-mentioned contents, the difference between the present invention and the conventional technology is that the force sensor, the displacement sensor and the inertial measurement unit of the flange device of the present invention are used to sense the contact data, the contact data is filtered, and the filtered contact data is calculated based on the attitude & heading reference systems (AHRS) algorithm, to obtain the force control command to control the displacement direction and the displacement distance of the flange device, so that the flange device is able to adjust the contact status between the polishing device and the to-be-polished object by using the voice coil motor.

Therefore, the technical solution of the present invention is able to solve the conventional technology problem that the conventional pneumatic adjustment device used in the tandem robot arm for the polishing operation has insufficient adjustment accuracy due to excessive environmental noise and instable air pressure, thereby achieving the technical effect of providing an electromagnetic contact-state adjustment device with quiet and precise control and fast response.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A flange device using a voice coil motor, wherein the flange device is fastened on a distal end of a tandem robot arm and comprises:
a movable member comprising a motion limiting part protruded thereon;
the voice coil motor;
a force sensor configured to sense a contact force of the flange device during a polishing operation process;
a displacement sensor configured to sense a displacement direction and a displacement distance of the movable member;
an inertial measurement unit configured to measure three-axis Euler angles and three-axis accelerations of the flange device; and
a fastening base frame comprising a fastening part, a motor fastening groove and a position-limiting accommodation part, wherein the voice coil motor is fastened on an inner surface of the fastening part and disposed in the motor fastening groove, the motion limiting part is fastened in the voice coil motor, the motion limiting part is protruded into the motor fastening groove and configured to fit with the position-limiting accommodation part, the position-limiting accommodation part has an accommodation space formed therein is configured to accommodate the force sensor, the displacement sensor and the inertial measurement unit, and when the movable member is driven to move relative to the position-limiting accommodation part by the voice coil motor through a rail and a sliding slot, the movement of the movable member is limited by the fastening part and the motion limiting part.

2. The flange device using the voice coil motor according to claim 1, wherein the flange device is fastened with the distal end of the tandem robot arm through an outer surface of the fastening part.

3. The flange device using the voice coil motor according to claim 1, further comprising a connection plate part, wherein the connection plate part comprises a top end and a bottom end, and the connection plate part is fastened on a member fastening part of the movable member through the bottom end thereof.

4. The flange device using the voice coil motor according to claim 3, further comprising a clamping member, wherein the clamping member comprises a clamping part and a clamping and fastening part, the clamping part is configured to clamp and fasten a polishing device, and the clamping member is fastened on the top end through the clamping and fastening part thereof.

5. The flange device using the voice coil motor according to claim 4, wherein the connection plate part and the clamping member are made by polymer materials.

6. The flange device using the voice coil motor according to claim 1, wherein one of the movable member and the position-limiting accommodation part comprises the rail disposed thereon, the other of the movable member and the position-limiting accommodation part comprises the sliding slot having a shape matching a shape of the rail, the movable member is driven to move relative to position-limiting accommodation part by the voice coil motor through the rail and the sliding slot, and the movable member fits with the position-limiting accommodation part.

7. The flange device using the voice coil motor according to claim 1, wherein the movable member and the fastening base frame are made by metal materials.

8. A contact control method for the flange device of claim 1, comprising:
receiving a contact force of the flange device from the force sensor, by a controlling device;
receiving a displacement direction and a displacement distance of the movable member from the displacement sensor, by the controlling device;
receiving three-axis Euler angles and a three-axis accelerations of the flange device from the inertial measurement unit (IMU), by the controlling device;
calculating a tilted angle of the flange device based on three-axis accelerations of the flange device and an attitude & heading reference systems (AHRS) algorithm, by the controlling device;
calculating a gravity response on the flange device based on a weight and the tilted angle of the flange device, and excluding the gravity response, by the controlling device;
performing data filtering on the three-axis accelerations of the flange device, by the controlling device;

integrating the filtered three-axis accelerations of the flange device to calculate three-axis speeds, respectively, by the controlling device;

performing data filtering on the three-axis speeds of the flange device, by the controlling device;

integrating the filtered three-axis speeds of the flange device to calculate three-axis displacements, respectively, by the controlling device;

calculating the three-axis displacements of the flange device; and performing correction on the AHRS algorithm based on the calculated three-axis displacements of the flange device and the sensed displacement distance of the movable member, and calculating a force control command to control the displacement direction and the displacement distance of the movable member, by the controlling device.

* * * * *